US011231611B2

(12) United States Patent
Nishimoto et al.

(10) Patent No.: US 11,231,611 B2
(45) Date of Patent: Jan. 25, 2022

(54) COATING COMPOSITION, CONDUCTIVE FILM AND LIQUID CRYSTAL DISPLAY PANEL

(71) Applicant: Maxell Holdings, Ltd., Kyoto (JP)

(72) Inventors: Tomohisa Nishimoto, Kyoto (JP); Satoshi Kobayashi, Kyoto (JP); Yoshiyuki Makida, Kyoto (JP); Yoshimasa Mitsumoto, Kyoto (JP); Kaori Kitabatake, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 16/643,948

(22) PCT Filed: Sep. 7, 2018

(86) PCT No.: PCT/JP2018/033268
§ 371 (c)(1),
(2) Date: Mar. 3, 2020

(87) PCT Pub. No.: WO2019/176140
PCT Pub. Date: Sep. 19, 2019

(65) Prior Publication Data
US 2020/0409211 A1    Dec. 31, 2020

(30) Foreign Application Priority Data

Mar. 15, 2018   (JP) .............................. JP2018-047839

(51) Int. Cl.
*G02F 1/1335* (2006.01)
*C09D 7/61* (2018.01)
(Continued)

(52) U.S. Cl.
CPC ......... *G02F 1/133516* (2013.01); *C09D 7/20* (2018.01); *C09D 7/61* (2018.01);
(Continued)

(58) Field of Classification Search
CPC ........... G02F 1/133516; G02F 1/13338; G02F 1/1368; G02F 1/136222; C09D 7/61; C09D 7/20
(Continued)

(56) References Cited

U.S. PATENT DOCUMENTS

| | | | |
|---|---|---|---|
| 2004/0016914 A1 | 1/2004 | Matsuda et al. | |
| 2011/0228188 A1* | 9/2011 | Kim | G02F 1/13338 349/43 |
| 2020/0033674 A1* | 1/2020 | Fujita | G09F 9/30 |

FOREIGN PATENT DOCUMENTS

| | | |
|---|---|---|
| CN | 1482854 A | 3/2004 |
| CN | 101783199 A | 7/2010 |

(Continued)

OTHER PUBLICATIONS

International Search Report issued in corresponding International Patent Application No. PCT/JP2018/033268, dated Dec. 4, 2018, with English translation.

(Continued)

*Primary Examiner* — Charles S Chang
(74) *Attorney, Agent, or Firm* — McDermott Will & Emery LLP

(57) ABSTRACT

The present invention addresses the problem of providing a coating composition and an electroconductive film, capable of improving touch panel performance, such as operational stability over time and touch detection sensitivity of a liquid crystal display panel having a reduced thickness. This problem is solved by a coating composition comprising chain-like electroconductive inorganic particles, a binder, a high-boiling-point solvent, and a low-boiling-point solvent, wherein: the contained amount of the chain-like electroconductive inorganic particles with respect to the total amount of the chain-like electroconductive inorganic particles and the binder is 30-90 mass %; the binder is an alkoxysilane (Continued)

having a weight-average molecular weight of 1,000-20,000; and said coating composition is intended to be used in a liquid crystal display panel that has a TFT array substrate, touch detection electrodes, a liquid crystal layer, and a color filter substrate in order to form an electroconductive film on a base material surface of said color filter substrate on the opposite side of the liquid crystal layer.

12 Claims, 2 Drawing Sheets

(51) Int. Cl.
    *G02F 1/1333*     (2006.01)
    *C09D 7/20*     (2018.01)
    *G02F 1/1368*     (2006.01)
    *G02F 1/1362*     (2006.01)

(52) U.S. Cl.
    CPC ........ *G02F 1/1368* (2013.01); *G02F 1/13338* (2013.01); *G02F 1/136222* (2021.01)

(58) Field of Classification Search
    USPC .......................................................... 349/12
    See application file for complete search history.

(56) References Cited

FOREIGN PATENT DOCUMENTS

| | | |
|---|---|---|
| GB | 2288184 A | 10/1995 |
| JP | 2006-199781 A | 8/2006 |
| JP | 2013-095817 A | 5/2013 |
| KR | 2015-0002334 A | 1/2015 |
| WO | 2014/142121 A1 | 9/2014 |

OTHER PUBLICATIONS

Translation of International Preliminary Report on Patentability and Written Opinion of the International Searching Authority for PCT/JP2018/033268, dated Sep. 24, 2020.

Chinese Officie Action issued in corresponding Chines Patent Application No. 201880055729.5, dated Feb. 4, 2021, with Engish translation.

Extended European Search Report issued in corresponding EP Application No. 18909843.7, dated Nov. 26, 2021.

\* cited by examiner

COATING COMPOSITION, CONDUCTIVE FILM AND LIQUID CRYSTAL DISPLAY PANEL

CROSS REFERENCE

This application is the U.S. National Phase under 35 U.S.C. § 371 of International Application No. PCT/JP2018/033268, filed on Sep. 7, 2018, which claims the benefits of Japanese Application No. 2018-047839, filed on Mar. 15, 2018, the entire contents of which are hereby incorporated by reference.

BACKGROUND OF THE INVENTION

Field of the Invention

The present invention relates to a coating composition for forming a conductive film, and particularly to a coating composition for forming a conductive film of a liquid crystal display panel.

Description of Related Art

As a type having been used for liquid crystal display panels, a vertical electric field-type represented by a TN (twisted nematic)-type has predominantly been used, but a liquid crystal display panel called a horizontal electric field-type has also been becoming mainstream recently. A horizontal electric field-type liquid crystal display panel has an advantage of having a wider viewing angle than a vertical electric field-type. However, it has a problem that the display quality decreases due to the occurrence of light leakage attributed to electrostatic influence from the outside or inside of the liquid crystal display panel, or external electromagnetic interference in performing black display, which does not occur in the vertical electric field-type liquid crystal display panel.

In order to solve such a problem in the horizontal electric field-type, a technology in which an electrostatic discharge (ESD) function is imparted to the horizontal electric field-type liquid crystal display panel by forming a conductive layer having translucency on the surface on the opposite side to a liquid crystal layer side of a transparent substrate, which corresponds to farther side of the transparent substrate in the liquid crystal display panel from the backlight unit, has been proposed. Specifically, a method for forming an antistatic film containing ITO as a conductive layer has been put into practical use.

Recently, demand for liquid crystal display devices equipped with a liquid crystal display panel having a touch panel function has been increasing as typified by liquid crystal display devices used in smartphones. Various types have been proposed based on the principle of detecting the position on a touch panel sensor. In smartphones, capacitive sensing-type is frequently used since it is optically bright and has a simple structure. The principle is a mechanism in which a parasitic capacitance is newly generated as the external conductor of which the position is to be detected comes into contact with the touch panel sensor layer via the dielectric, and the position of the object is detected by utilizing a change in this capacitive coupling.

As an example of a built-in touch panel function-type liquid crystal display panel, there is a so-called in-cell touch panel. The in-cell touch panel is a built-in touch panel function-type liquid crystal display panel having a layer structure in which a touch detection electrode is stacked between a color filter substrate and a TFT array substrate.

WO 2014/142121 A describes the structure of an in-cell touch panel. The touch panel illustrated in FIG. 2 of WO 2014/142121 A has a layer structure including a TFT array substrate, a liquid crystal driving electrode, a touch detection electrode, a liquid crystal layer, a color filter substrate, and a conductive layer, stacked between two polarizing plates.

The conductive layer has a conductive function and is electrically connected to the TFT array substrate. Hence, the conductive layer decreases disturbance of image display when static electricity is applied to the surface of the polarizing plate. Alternatively, the conductive layer has an effect of properly maintaining the touch detection sensitivity even when static electricity is applied to the surface of the polarizing plate.

In-cell touch panels exhibit excellent sensitivity and are thus adopted in liquid crystal display devices which are required to have high quality.

RELATED ART DOCUMENT

Patent Document

Patent Document 1: WO 2014/142121

SUMMARY OF THE INVENTION

Touch panels have a problem that touch detection sensitivity and operation reliability and stability has decreased as liquid crystal display panels have been thinned in recent years.

The present invention provides a coating composition comprising chain-like conductive inorganic particles, a binder, a high-boiling solvent and a low-boiling solvent, wherein a content of the chain-like conductive inorganic particles is 30% to 90% by mass based on a total amount of the chain-like conductive inorganic particles and the binder, the binder is alkoxysilane having a weight average molecular weight of 1,000 to 20,000, and the coating composition is used for forming a conductive film on a substrate surface on the opposite side to a liquid crystal layer side of a color filter substrate in a liquid crystal display panel having a TFT array substrate, a touch detection electrode, the liquid crystal layer and the color filter substrate.

In an embodiment, the liquid crystal display panel is an in-cell touch panel.

In an embodiment, the substrate on which a conductive film is formed has a thickness of 500 μm or less.

In an embodiment, the substrate on which a conductive film is formed is a stacked body having a TFT array substrate in a lowermost layer and a color filter substrate in an uppermost layer.

In an embodiment, the coating composition contains solid content consisting of the chain-like conductive inorganic particles and the binder in an amount of 0.1% to 20.0% by mass, and has a viscosity of 0.5 to 100 mPa·s.

In an embodiment, the chain-like conductive inorganic particles are formed by linking 2 to 50 of primary particles having a particle diameter of 2 to 30 nm to each other.

In an embodiment, the chain-like conductive inorganic particles include at least one kind of particles selected from the group consisting of antimony-containing tin oxide particles, tin-containing indium oxide particles, and phosphorus-containing tin oxide particles.

The present invention also provides a conductive film formed, using any of the above-described coating compositions, on a substrate surface on the opposite side to a liquid crystal layer side of a color filter substrate in a liquid crystal display panel having a TFT array substrate, a touch detection electrode, the liquid crystal layer and the color filter substrate.

In an embodiment, the conductive film has a thickness of 10 to 300 nm.

In an embodiment, the conductive film has a surface electric resistance of $1.0 \times 10^7$ to $1.0 \times 10^{10}$ Ω/square.

In an embodiment, the conductive film has a pencil hardness of 3H to 9H.

A liquid crystal display panel comprising a TFT array substrate, a touch detection electrode, a liquid crystal layer, a color filter substrate and the conductive film according to any one of claims 6 to 9.

According to the present invention, there are provided a coating composition and a conductive film which are able to improve touch panel performance such as touch detection sensitivity and time-dependent operation stability of a thinned touch panel.

DETAILED DESCRIPTION OF PREFERRED EMBODIMENTS

Figure 1:
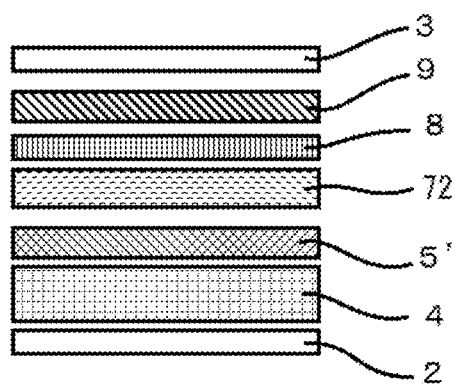
FIG. 1 is a schematical cross-sectional view illustrating a layer structure of an in-cell touch panel to which a coating composition of the present invention may be applied.

The touch panel to which the coating composition of the present invention is applied is a capacitive touch panel which detects a capacitance that changes depending on the capacity of an object which approaches or comes into contact with an electrode. In addition, the liquid crystal display device with touch detection function using the above-described touch panel is a horizontal electric field-type liquid crystal display device in which a detection electrode for touch detection is provided on either a TFT array substrate or a counter substrate which forms the display device. The counter substrate is a color filter substrate.

(Coating Composition)

First, the coating composition of the present invention will be described.

The coating composition of the present invention contains chain-like conductive inorganic particles, a binder, a high-boiling solvent and a low-boiling solvent. In addition, it is characterized in that the content of the chain-like conductive inorganic particles is 30% to 90% by mass based on the total amount of the chain-like conductive inorganic particles and the binder.

By using the above-described coating composition, it is possible to provide a conductive film which has high ESD function, does not decrease the touch sensitivity, and has excellent light transmittance and hardness.

<Chain-Like Conductive Inorganic Particles>

The coating composition of the present invention can provide a conductive film which has high ESD function and does not decrease touch sensitivity by adjusting the content of the chain-like conductive inorganic particles is 30% to 90% by mass based on the total amount of the chain-like conductive inorganic particles and the binder. When the content of the chain-like conductive inorganic particles is less than 30% by mass, the ESD function of the conductive film decreases. When the content of the chain-like conductive inorganic particles is more than 90% by mass, the touch sensitivity decreases. The content of the chain-like conductive inorganic particles is preferably 40% to 88% by mass, more preferably 50% to 85% by mass, and still more preferably 72% to 76% by mass based on the total amount of the chain-like conductive inorganic particles and the binder.

In addition, it is possible to enhance the conductivity of the conductive film even when the chain-like conductive inorganic particles are used in a smaller amount than non-chain-like conductive inorganic particles. It is assumed that this is because as the inorganic particles have a chain structure, the conductive networks between the inorganic particles increase, and the conductivity of the entire conductive film is improved compared to a case where the inorganic particles exist individually. For this reason, it is possible to decrease the amount of inorganic particles for achieving the predetermined conductivity of the conductive film, and thus to improve the light transmittance of the conductive film as well.

The chain-like conductive inorganic particles refer to chain-like secondary particles in which primary particles are coupled to each other. The primary particles mean particles which exist individually, and the secondary particles mean particles in which two or more primary particles exist. Specifically, as the chain-like conductive inorganic particles, it is preferable to use one in which 2 to 50 of primary particles having a particle diameter of 2 to 30 nm are linked to each other, and it is more preferable to use one in which 3 to 20 of primary particles are linked to each other. When the number of linking of primary particles having the above particle diameter exceeds 50, the haze value of the conductive film tends to increase by scattering of the particles. On the other hand, when the number of linking of primary particles having the above particle diameter is less than 2, the particles become non-chain-like. Then, it is difficult to form a conductive network between the inorganic particles and the conductivity of the conductive film decreases.

The particle diameter and the number of linking of primary particles can be determined, for example, by observing and measuring the particle diameter of the individual particles constituting the chain-like conductive inorganic particles and the number of linking of the primary particles under a transmission electron microscope (TEM), for conductive films obtained by diluting a coating composition with a low-boiling solvent and applying the diluted coating composition on various substrates as thin film in thickness of 2 to 10 nm.

The chain-like conductive inorganic particles are not particularly limited as long as they are chain-like particles exhibiting both transparency and conductivity. The particles such as metal particles, carbon particles, conductive metal oxide particles, and conductive nitride particles may be used. Among these particles, conductive metal oxide particles having both transparency and conductivity are preferable. Examples of the conductive metal oxide particles include metal oxide particles such as tin oxide particles, antimony oxide particles, antimony-containing tin oxide (ATO) particles, tin-containing indium oxide (ITO) particles, phosphorus-containing tin oxide (PTO) particles, aluminum-containing zinc oxide (AZO) particles and gallium-containing zinc oxide (GZO) particles. The conductive metal oxide particles may be used alone or in a combination of two or more kinds thereof. Moreover, the chain-like conductive inorganic particles preferably include at least one selected from the group consisting of ATO particles, ITO particles, and PTO particles. This is because those conductive inorganic particles exhibit excellent transparency, conductivity and chemical properties, and are able to accomplish high light transmittance and conductivity even when used in a conductive film.

The method for producing the chain-like conductive inorganic particles is not particularly limited, but it may adopt, for example, the production methods described in Japanese Patent Laid-open Publication No. 2000-196287, Japanese Patent Laid-open Publication No. 2005-139026, Japanese Patent Laid-open Publication No. 2006-339113, and Japanese Patent Laid-open Publication No. 2012-25793.

<Binder>

The binder is not particularly limited as long as it is capable of dispersing the chain-like conductive inorganic particles to form a coating film, and both an inorganic binder and an organic binder may be used. The content of the binder is preferably 10% or more by mass based on the total amount of the chain-like conductive inorganic particles and the binder. This is because the strength of the conductive thin film tends to decrease when the content is less than 10% by mass.

It is preferable to use an inorganic binder as the binder in view of improving the strength of the conductive film. The inorganic binder such as alkoxysilane may be used. More specifically, the alkoxysilane such as a compound in which 3 to 4 alkoxy groups are bonded to silicon atom and are polymerized to form a high molecular weight $SiO_2$ body linked to each other by —OSiO— when dissolved in water, may be used.

As the alkoxysilane, it is preferable to contain at least one polyfunctional alkoxysilane selected from the group consisting of tetraalkoxysilane, trialkoxysilane, dialkoxysilane and alkoxysilane oligomer. An alkoxysilane oligomer is a high molecular weight alkoxysilane formed by condensation of alkoxysilane monomers and refers to an oligomer having two or more siloxane bonds (—OSiO—) in one molecule.

Examples of the tetraalkoxysilane include silanes that are tetra-substituted with an alkoxy group having 1 to 4 carbon atoms, such as tetramethoxysilane, tetraethoxysilane, tetrapropoxysilane, tetra-iso-propoxysilane and tetra-t-butoxysilane. Specific examples thereof include "Ethyl Silicate 28 (molecular weight: 208)" manufactured by COLCOAT CO., LTD.

Examples of the trialkoxysilane include silanes that are tri-substituted with an alkoxy group having 1 to 4 carbon atoms, such as trimethoxysilane, triethoxysilane, tripropoxysilane, tributoxysilane, tri-iso-propoxysilane and tri-L-butoxysilane, and silanes that are partially substituted with an alkyl group, such as "KBM-13 (methyltrimethoxysilane)" and "KBE-13 (methyltriethoxysilane)".

Examples of the dialkoxysilane include silanes that are di-substituted with an alkoxy group having 1 to 4 carbon atoms, such as dimethyldimethoxysilane, diphenyldimethoxysilane, dimethyldiethoxysilane and diphenyldiethoxysilane, and silanes that are partially substituted with an alkyl group, such as "KBM-22 (dimethyldimethoxysilane)" and "KBE-22 (dimethyldiethoxysilane)".

Examples of the alkoxysilane low-molecular oligomer include relatively low-molecular weight alkoxysilane oligomers having an alkoxysilyl group alone or both an organic group and an alkoxysilyl group. Specific examples thereof include "Methyl Silicate 51 (molecular weight: 470)" and "Ethyl Silicate 40 (molecular weight: 745)" manufactured by COLCOAT CO., LTD. and "X-40-2308 (molecular weight: 683)" manufactured by Shin-Etsu Chemical Co., Ltd.

Among the specific examples of the alkoxysilane, tetraalkoxysilane, tetraalkoxysilane and trialkoxysilane, trialkoxysilane and dialkoxysilane that are partially substituted with an alkyl group, and alkoxysilane oligomers of which the functional group is an alkoxysilyl group, are suitable for forming a conductive thin film having higher hardness. This is because by using them, the hardness of the conductive film increases owing to three-dimensional crosslinking resulted from promoted siloxane bonds between binder molecules, the risk that cracking of the conductive thin film occurs with time-dependent change is still more reduced, and the adhesion property with the substrate may be further enhanced.

Furthermore, in order to form a high quality film with favorable reproducibility in a more stable state, it is preferable to use the coating composition in a silanolized state resulted from the promoted hydrolysis reaction of alkoxysilane of the coating composition. Examples of the preparing method include a method in which water and an acid catalyst are added to alkoxysilane diluted with a low-boiling solvent such as an alcohol to silanolize the coating composition in advance and a method in which water and an acid catalyst are added to the conductive coating composition to silanolate the conductive coating composition. The theoretical value of water content is determined by determining the ratio of hydrolysis from the structure of alkoxysilane but is appropriately adjusted depending on the pot life and coating suitability of the coating composition and physical properties of the conductive film. The water content is preferably 50% to 1500% by mass based on the total amount of alkoxysilane. This is because the strength of the conductive thin film decreases when the content is less than 50% by mass and the coating suitability is affected so that the drying rate slows down when the content is more than 1500% by mass.

The alkoxysilane oligomer used in the present invention has a weight average molecular weight of 1,000 to 20,000. Hence, the coating composition of the present invention exhibits excellent coating performance, easily forms a thin conductive film, and increases the hardness, particularly, the scratch-resistant hardness of the conductive film. Moreover, the conductive film is less likely to shrink when the coating film is cured. The weight average molecular weight of the alkoxysilane oligomer used in the present invention is preferably 2,000 to 15,000, and more preferably 6,000 to 12,000.

As the hardness and dimensional stability of the conductive film are improved, the touch detection sensitivity and operation reliability and stability of the built-in touch panel function-type liquid crystal display panel are improved. The effect by the improvement in hardness and dimensional stability of the conductive film is more effective, for example, in a case in which the substrate on which the film of the present invention is formed is thinned. Thinned substrate exhibit poor strength and dimensional stability in some cases.

The coating composition of the present invention is applied, for example, to the substrate surface on the opposite side to a liquid crystal layer side of a color filter substrate to form a conductive film. The substrate in this case is specifically, a stacked body having a TFT array substrate in the lowermost layer and a color filter substrate in the uppermost layer.

The TFT array substrate and the color filter substrate have a structure in which a functional layer is supported on a support. Each of the upper surface and lower surface of the stacked body has the exposed surface of the support of the color filter substrate and the exposed surface of the support of the TFT array substrate, respectively. The support of the TFT array substrate and color filter substrate are typically glass plate. Incidentally, there are members such as a liquid crystal driving electrode, a touch detection electrode and a liquid crystal layer between the TFT array substrate and the color filter substrate, constituting touch panel. The thinned substrate has, for example, a thickness of 500 μm or less, and preferably 300 μm or less.

The method for producing the alkoxysilane oligomer having a weight average molecular weight of 1,000 to 20,000 is not particularly limited, but the production methods described, for example, in Japanese Patent Laid-open Publication No. 2007-31464 and Japanese Patent Laid-open Publication No. 2014-224166 may be adopted.

It is possible to prepare an oligomer by, for example, adding alkoxysilane in the presence of a solvent, an acid catalyst and water, performing hydrolysis and condensation reaction to polymerize monomolecular silane and, if necessary, removing the solvent and acid catalyst. Control of the molecular weight and molecular weight distribution of the oligomer depends on stirring method, stirring conditions such as temperature and time, addition methods such as batch addition and dropwise addition, the addition conditions such as temperature such as constant temperature, temperature rise and temperature decrease, time and the dropping order, and the pH conditions in each scheme.

Moreover, in the present invention, it is preferable that each molecular units exists in the alkoxysilane oligomer in a certain molar ratio. Herein, a molecular unit means a molecule in an oligomer having different kinds of functional groups, and it is possible to achieve all the various quality properties such as electrical properties, optical properties, hardness, warpage, dimensional stability, touch sensitivity, noise shielding property and time-dependent stability of the conductive film when an alkoxysilane in which different molecular units exist in a certain molar ratio is used.

For example, a typical example of the alkoxysilane oligomer is one having a structure represented by the following formulas.

[Chem. 1]

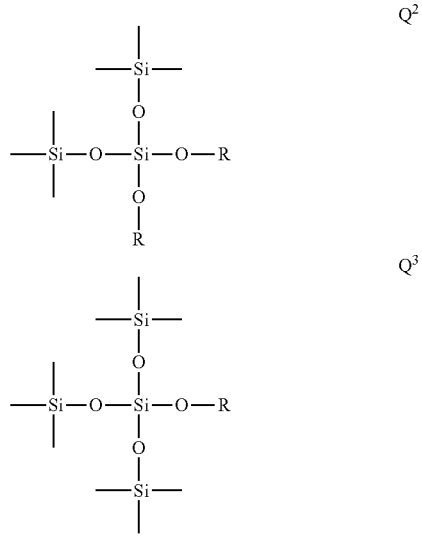

-continued

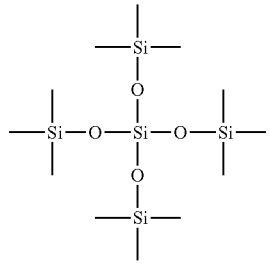

In the formulas, R denotes an alkoxy group having 1 to 4 carbon atoms or hydrogen, $Q^2$, $Q^3$ and $Q^4$ denote molecular units constituting an alkoxysilane oligomer, and the proportion of $Q^2:Q^3:Q^4$ is 12:57:31 in a molar ratio.

Specific examples of the alkoxysilane oligomer include "Ethyl Silicate 48" and "Methyl Silicate 53A", manufactured by COLCOAT CO., LTD., "MKC Silicate (high polymerization degree type)", manufactured by Mitsubishi Chemical Corporation, and "ELECM P-8517", manufactured by JGC Catalysts & Chemicals Ltd. in addition to the alkoxysilane oligomer having the molecular unit described above.

Moreover, the organic binder such as an acrylic resin, a polyester resin, a polyamide resin, a polycarbonate resin, a polyurethane resin, a polystyrene resin, a polyvinyl chloride resin, a polyvinylidene chloride resin, a polyvinyl alcohol resin, a polyvinyl acetate resin and a photopolymerizable resin containing a photopolymerizable monomer and a polymerization initiator may be used.

<High-Boiling Solvent>

The high-boiling solvent is not particularly limited as long as they are capable of dissolving binder components and being removed by a drying step after coating. The high-boiling solvent such as ethylene glycol, dimethyl sulfoxide, N-methylpyrrolidone, N-ethylpyrrolidone, N-methylformamide, 1,2-propanediol, N,N-dimethylaniline, cresol and nitrobenzene may be used. Particularly preferred examples thereof include ethylene glycol and dimethyl sulfoxide. The high-boiling solvent is preferably organic and inorganic solvents having a boiling point of 120° C. or more.

The content of the high-boiling solvent may be about 0.1% to 30.0% by mass based on the total amount of the conductive coating composition.

<Low-Boiling Solvent>

The low-boiling solvent such as ethyl alcohol, methyl alcohol, n-propyl alcohol, isopropyl alcohol, n-butyl alcohol, isobutyl alcohol, methyl ethyl ketone, methyl isobutyl ketone, tetrahydrofuran, acetone, dioxane, ethyl acetate, chloroform, acetonitrile, pyridine, acetic acid and water may be used. Particularly preferred examples thereof include ethyl alcohol, methyl alcohol, n-propyl alcohol and isopropyl alcohol. By using the low-boiling solvent, the dispersibility of the chain-like conductive inorganic particles is improved. The low-boiling solvent is preferably organic and inorganic solvents having a boiling point of less than 120° C.

The content of the low-boiling solvent may be about 50.0% to 99.5% by mass based on the total amount of the conductive coating composition.

<Acid Catalyst>

Commonly used acid catalyst (hydrochloric acid, sulfuric acid, acetic acid, or phosphoric acid) may be further added to the coating composition of the present invention. This allows it to form a conductive film having more stable performance and high quality with favorable reproducibility. The content of the acid catalyst may be about 1.0% to 30.0% by mass based on the total amount of alkoxysilane.

<Leveling Agent>

A leveling agent may be further added to the coating composition of the present invention. This makes it possible to secure the surface smoothness of the conductive film. The leveling agent such as polyether-modified polydimethylsiloxane and dipropylene glycol monomethyl ether may be used. The content of the leveling agent catalyst may be about 0.01% to 5.0% by mass based on the total amount of the conductive coating composition.

<Preparation Method>

The method for preparing the coating composition of the present invention is not particularly limited as long as it is capable of mixing the components to disperse the chain-like conductive inorganic particles in the binder and solvent. The each component may be mixed and dispersed by performing a mechanical treatment using media such as ball mill, sand mill, pico mill and paint conditioner, or a dispersion treatment using an ultrasonic disperser, a homogenizer, a disper and a jet mill or the like.

The coating composition of the present invention after the preparation has a solid content concentration of 0.1% to 20.0% by mass based on the total amount. The solid content in the coating composition is typically the total amount of the chain-like conductive inorganic particles and the binder. When the solid content concentration in the coating composition is less than 0.1% by mass, the amount of the coating composition applied increases in order to control the thickness of the conductive film in a proper range. This leads to take time to transform from a wet film to a dry film in the drying process, and make the manufacturing process not practical. On the other hand, when the solid content concentration is more than 20.0% by mass, the amount of the coating composition applied decreases, and thus the thickness of the wet film is insufficient. This leads the leveling performance to be not exerted and causes deviations of film properties such as surface electric resistance in the substrate. The solid content concentration in the coating composition is preferably 0.3% to 15.0% by mass, and more preferably 0.5% to 10.0% by mass.

The coating composition of the present invention preferably has a viscosity of 0.5 to 100 mPa·s. When the viscosity of the coating composition is more than 100 mPa·s, atomization of the composition in the spray method is not suitably performed. The spray droplets become too large or the distribution of the spray droplet size is too uneven. On the other hand, when the viscosity is less than 0.5 mPa·s, the amount of the composition jetted increases. The wet film thickness is too thick, and it causes drying unevenness. It leads to occurs property deviations of film properties such as surface electric resistance in the substrate or deteriorates the film appearance. The viscosity of the coating composition is preferably 0.6 to 50 mPa·s, and more preferably 0.8 to 20.0 mPa·s.

(Conductive Film)

Next, the conductive film of the present invention will be described.

The conductive film of the present invention is formed by forming a coating film by applying the coating composition of the present invention to the substrate surface on the opposite side to a liquid crystal layer side of the color filter substrate to be described later, then drying and, if necessary, curing the coating film.

The method for applying the transparent conductive coating composition is not particularly limited as long as it is capable of forming a smooth coating film. Coating methods such as spin coating, roll coating, die coating, air knife coating, blade coating, reverse coating, gravure coating, microgravure coating, spray coating, slit coating and dip coating or printing methods such as gravure printing, screen printing, offset printing and inkjet printing may be used, but spray coating is preferable which is advantageous in terms of coping with thinning of the substrate, simplification of the manufacturing apparatus, and manufacturing cost.

As a method for applying the coating composition, it is preferable to use a spray coating method. Compared to other coating methods such as slit coating and spin coating, examples of the features of the spray coating method include less deviations of the film thickness due to the method's insusceptibility to the thickness deviation in the glass substrate, less deviations of the film thickness in the plane direction of the large-sized substrate, and easier arrangement even when the substrates having different sizes are used.

As the coating conditions using a spray coating method, the caliber of spray gun is preferably 0.5 to 3.0 mm, needle opening is preferably 0.05 to 0.30 mm, the amount of liquid jetted is preferably 0.10 to 3.00 g/min, the shortest distance between the spray gun and the substrate is preferably 50 to 300 mm, the coating speed is preferably 100 to 2000 mm/sec, the overlapping pitch is preferably 2 to 30 mm, and the pressure of the atomized air is preferably 0.05 to 0.50 MPa. As the number of spray guns, a plurality of spray guns may be disposed depending on the substrate size in view of coating efficiency in addition to a case of using a single gun.

The coating composition is applied on the upper surface of the substrate, and then the solvent is removed by drying to form a film. If necessary, the coating film may be irradiated with UV light and EB light to cure the coating film. For example, a film formed by forming a coating film using the coating composition of the present invention and the spray coating method, drying it, and optionally curing it may be referred to as a conductive spray film.

The conductive film of the present invention has a surface electric resistance of $1.0 \times 10^7$ to $1.0 \times 10^{10}$ Ω/square. When the surface electric resistance of the conductive film is less than $1.0 \times 10^7$ Ω/square, the touch sensitivity decreases. When the surface electric resistance is more than $1.0 \times 10^{10}$ Ω/square, the antistatic performance decreases. The surface electric resistance of the conductive film is preferably $2.0 \times 10^7$ to $9.0 \times 10^9$ Ω/square, and more preferably $3.0 \times 10^7$ to $8.0 \times 10^9$ Ω/square.

The surface electric resistance of the conductive film of the present invention after being held for 500 hours in an environment having a temperature of 65° C. and a relative humidity of 90% is $1.0 \times 10^7$ to $1.0 \times 10^{10}$ Ω/square, preferably $2.0 \times 10^7$ to $9.0 \times 10^9$ Ω/square, and more preferably $3.0 \times 10^7$ to $8.0 \times 10^{10}$ Ω/square. Incidentally, in order to provide a conductive film which has high ESD function and does not decrease the touch sensitivity after a reliability test, it is preferable that the change in the surface electric resistance before and after the reliability test is in the range of 1.0 Ω/square even when the surface electric resistance changes to the lower range or the upper range. More preferably, the change is in the range of 0.5 Ω/square.

The conductive film of the present invention has a thickness of 10 to 300 nm. When the thickness of the conductive film is less than 10 nm, the thickness is smaller than the size of the primary particles themselves. Thus, the smoothness of the film surface is impaired and deviations of surface electric resistance are likely to be caused. When the thickness is more than 300 nm, the total light transmittance of the film decreases. The thickness of the conductive film is preferably 15 to 200 nm, and more preferably 20 to 100 nm.

The conductive film of the present invention has a pencil hardness of 3H to 9H, preferably 4H to 9H, and more preferably 5H to 9H. In other words, when the pencil hardness is 2H or less, the surface of coating film may be more damaged and the yield may be more decreased in the washing process and the scribing process which follow the panel manufacturing process, and the polarizing plate bonding process.

The conductive film of the present invention has a total light transmittance (based on JIS K7105) of 95.0% or more, and preferably 97.0% to 99.9%.

Moreover, a touch panel is generally cut from a large-sized substrate into small-sized substrates using a diamond cutter in the panel manufacturing process. For this reason, it is preferable that the conductive film of the present invention doesn't genereate adhered material on a cutter and provides a smooth cut plane when it is cut together with the glass substrate.

<Touch Panel>

The touch panel to which the coating composition of the present invention is applied is a touch panel having a layer structure in which the touch panel substrate is inserted between a TFT array substrate and a color filter substrate. Typical examples of such a touch panel include an in-cell touch panel.

In the specification of the present application, "stacked" means that layered materials are in an overlapped state. The layers to be stacked may not be in contact with each other, for example, with another layer existing between the layers.

A conductive film is provided on the upper substrate surface on the opposite side to a liquid crystal layer side of a color filter substrate. When the conductive film is not provided, it is concerned that the image display is disturbed because static electricity applied from the outside of the in-cell touch panel charge, for example, the surface of the polarizing plate and it may cause the disturbance of the alignment state of the liquid crystal molecules in the liquid crystal layer.

On the other hand, when the conductive film is provided, it is possible for the film to release the static electricity applied from the outside of the in-cell touch panel to the outside. Thus, even when static electricity is applied to the in-cell touch panel, it is possible to decrease disturbance in the image display.

FIG. 1 is a schematical cross-sectional view illustrating a layer structure of an in-cell touch panel to which the coating composition of the present invention may be applied. In the in-cell touch panel of FIG. 1, a common electrode having touch detection function, namely, a common electrode with touch electrode 5' is stacked on a TFT array substrate 4. Moreover, a conductive film 9 is stacked between a color filter substrate 8 and an upper polarizing plate. A second touch detection electrode (not displayed) may be provided between the TFT array substrate 4 and the color filter substrate 8.

EXAMPLES

Hereinafter, the present invention will be specifically described based on Examples. However, the present invention is not limited to the following Examples. Moreover, "parts" and "%" in the following description are based on the mass unless otherwise stated.

The main materials used in Examples are shown in Table 1.

TABLE 1

| Substance name | Trade name | Manufacturer | Solid content (wt %) |
|---|---|---|---|
| Bead-like conductive inorganic filler dispersion (dispersion containing ATO filler: 19.2 wt %/silica-based dispersant: 1.3 wt %/low-boiling alcohol: 79.5 wt %) | V-3560 | JGC Catalysts & Chemicals Ltd. | 20.5 |
| Monodispersed conductive inorganic filler dispersion (dispersion containing ATO filler: 20.5 wt %/ dispersant: 2.0 wt %/low-boiling alcohol: 77.5 wt %) | Dispersion A | See Production Example | 22.5 |
| Alkoxysilane oligomer solution | — | See Synthesis Example 1 | 10.0 |
| Alkoxysilane oligomer solution | — | See Synthesis Example 2 | 10.0 |
| Alkoxysilane | X40-2308 | Shin-Etsu Chemical Co., Ltd. | 100.0 |
| Alkoxysilane | Ethyl silicate 28 | COLCOAT CO., LTD. | 100.0 |
| Acid catalyst | Phosphoric acid | | 100.0 |
| Leveling agent (solution containing polyether-modified polydimethylsiloxane: 15.0 wt %/dipropylene glycol monomethyl ether: 85.0 wt %) | BYK-337 | BYK Additives & Instruments | 15.0 |

<Chain-Like Antimony-Containing Tin Oxide (ATO) Particle Dispersion>

As a chain-like ATO particle dispersion, "ELCOM V-3560" manufactured by JGC Catalysts & Chemicals Ltd. was prepared. The chain-like ATO particle dispersion "ELCOM V-3560" is a mixed dispersion containing chain-like ATO particles at 19.2 parts, a silica-based dispersant at 1.3 parts, ethyl alcohol at 70.0 parts, and isopropyl alcohol at 9.5 parts.

Figure 2:
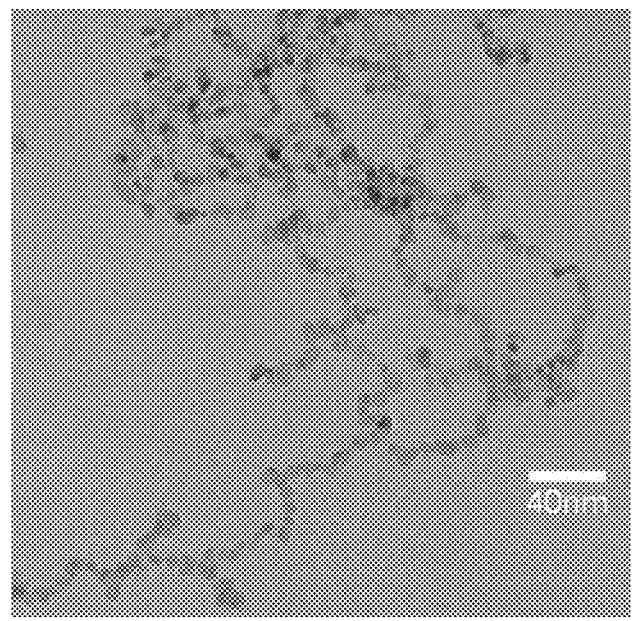
FIG. 2 is a transmission electron microscope image of chain-like antimony-containing tin oxide particles used in Example 1.
Figure 3:
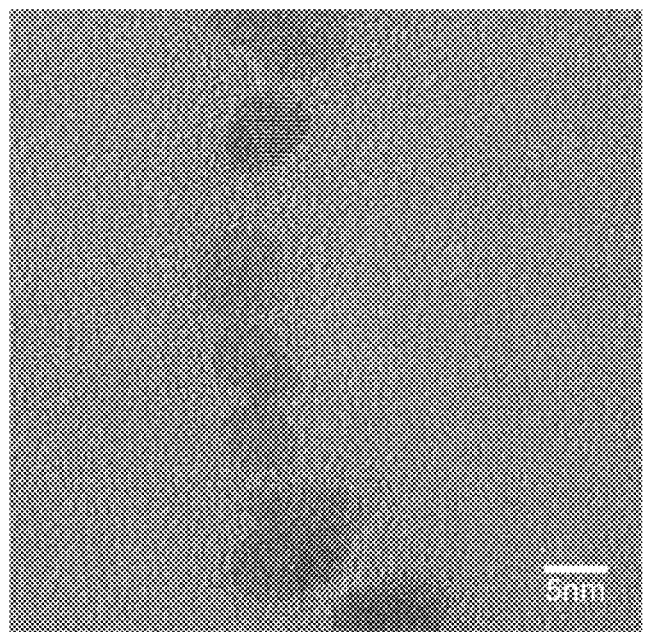
FIG. 3 is a magnified image of FIG. 2.

FIGS. 2 and 3 are transmission electron microscope (TEM) images of chain-like ATO particles used in the chain-like ATO particle dispersion. Referring to FIGS. 2 and 3, it can be seen that the ATO particles are chain-like ATO particles (chain-like conductive inorganic particles) formed by linking 2 to 50 of primary particles having a particle diameter of 2 to 30 nm to each other.

Production Example

<Production of Dispersion A>

Into a plastic bottle were introduced 20.5 parts of conductive ATO particles "SN100P" (trade name) manufactured by ISHIHARA SANGYO KAISHA, LTD., 2.0 parts of dispersant "BYK180" (trade name) manufactured by BYK, and 77.5 parts of isobutyl alcohol (solvent), and the mixture was dispersed for 2 hours with a paint conditioner (manufactured by TOYO SEIKI CO., LTD.) using zirconia beads having a diameter of 0.3 mm, and then stirred to produce a dispersion A.

Synthesis Example 1

To a solution filled with a proper amount of a low-boiling alcohol, a hydrochloric acid catalyst and water was added dropwise little by little a proper amount of tetramethoxysilane, and the mixture was stirred for a certain time, controlling the temperature and pH. Then, deacidification with ion exchange resin was performed, and an alkoxysilane oligomer solution having a solid content concentration of 10 wt % and a weight average molecular weight of 5,200 was prepared.

Synthesis Example 2

To a solution filled with a proper amount of a low-boiling alcohol, a hydrochloric acid catalyst and water was added dropwise little by little a proper amount of tetraethoxysilane, and the mixture was stirred for a certain time, controling the temperature and pH. Then, deacidification with ion exchange resin was performed, and an alkoxysilane oligomer having a solid content concentration of 10 wt % and a weight average molecular weight of 8,600 was synthesized.

Examples 1 to 4 and Comparative Examples 1 to 3

<Production of Coating Composition>

The each component was introduced into a plastic bottle in each predetermined content amount and stirred to prepare a coating composition. However, the alkoxysilane was used, diluted with a part of alcohol and silanolized in advance by adding water and an acid catalyst.

The viscosity of the coating composition obtained was measured using TV25 Model Viscometer manufactured by TOKI SANGYO CO., LTD. The kinds and mixed amounts of the components and the nonvolatile solid content and the viscosity of the coating composition are shown in Tables 2 and 3.

TABLE 2

| Category | Substance names and properties | Example 1 | Example 2 | Example 3 | Example 4 |
|---|---|---|---|---|---|
| Solid content (wt %) | Bead-like conductive inorganic filler dispersion (V-3560) | 2.0 | 3.0 | 6.0 | 2.5 |
| | Monodispersed conductive inorganic filler dispersion (dispersion A) | | | | |
| | Alkoxysilane oligomer solution (Synthesis Example 1) | 1.0 | | 16.0 | |
| | Alkoxysilane oligomer solution (Synthesis Example 2) | | 1.4 | | 1.5 |
| | Alkoxysilane (X40-2308) | | | | |
| | Alkoxysilane (Ethyl Silicate 28) | | | | |
| | Phosphoric acid | 0.1 | 0.1 | 0.1 | 0.1 |
| | Leveling agent (BYK-337) | 0.1 | 0.1 | 0.1 | 0.1 |
| Solvent (wt %) | Dimethyl sulfoxide | 7.0 | 7.0 | 7.0 | 7.0 |
| | Ethyl alcohol | 84.8 | 83.4 | 65.8 | 83.8 |
| | Ion-exchanged water | 5.0 | 5.0 | 5.0 | 5.0 |
| | Sum (wt %) | 100.0 | 100.0 | 100.0 | 100.0 |
| Composition | Solid content concentration (wt %) | 0.6 | 0.9 | 2.9 | 0.8 |
| | Viscosity (mPa · s) | 1.3 | 1.3 | 1.9 | 1.3 |

TABLE 3

| Category | Substance names and properties | Comparative Example 1 | Comparative Example 2 | Comparative Example 3 |
|---|---|---|---|---|
| Solid content (wt %) | Bead-like conductive inorganic filler dispersion (V-3560) | | 2.0 | 3.2 |
| | Monodispersed conductive inorganic filler dispersion (dispersion A) | 2.1 | | |
| | Alkoxysilane oligomer solution (Synthesis Example 1) | 1.4 | | |
| | Alkoxysilane oligomer solution (Synthesis Example 2) | | | |
| | Alkoxysilane (X40-2308) | | 0.1 | |
| | Alkoxysilane (Ethyl Silicate 28) | | | 0.4 |
| | Phosphoric acid | 0.1 | 0.1 | 0.1 |
| | Leveling agent (BYK-337) | 0.1 | 0.1 | 0.1 |
| Solvent (wt %) | Dimethyl sulfoxide | 7.5 | 7.0 | 7.0 |
| | Ethyl alcohol | 83.8 | 85.7 | 84.2 |
| | Ion-exchanged water | 5.0 | 5.0 | 5.0 |
| | Sum (wt %) | 100.0 | 100.0 | 100.0 |
| Composition | Solid content concentration (wt %) | 0.5 | 0.6 | 1.2 |
| | Viscosity (mPa · s) | 1.6 | 1.3 | 1.4 |

<Fabrication of Conductive Film>

The coating composition was applied to a non-alkali glass substrate having a size of 10 cm square and a thickness of 0.3 mm by a spray coating method to form a coating film. A spray gun (swirl nozzle, caliber: 1.0 mm) manufactured by NORDSON CORPORATION was used as a spray coater.

The coating conditions were as follows. Namely, the needle opening: 0.10 mm, the shortest distance between the spray gun and the substrate: 100 mm, the coating speed: 300 mm/sec, the overlapping pitch: 10 mm, the pressure of atomized air and swirl air: 0.25 MPa. In order to control the film thickness, the amount of liquid jetted was adjusted in the range of 0.50 to 1.00 g/min, and the coating film formed was heated at 120° C. for 1 hour to fabricate a conductive film.

Next, the properties of the conductive film obtained were tested as described below. The results are shown in Tables 4 and 5.

<Film Thickness>

The conductive film was cut together with the glass substrate, the cross section was observed under a scanning electron microscope (SEM, "8-4500" manufactured by Hitachi, Ltd.), and the film thickness was measured.

<Surface Electric Resistance>

The surface electric resistance of the conductive film was measured using a surface resistance meter ("HIRESTA MCP-HT450" manufactured by Mitsubishi Chemical Corporation, applied voltage: 10 V), and the measured value was taken as normal surface electric resistance.

In addition, after the glass substrate with conductive film was held in an environment having a temperature of 65° C. and a relative humidity of 90% for 500 hours, the surface electric resistance of the conductive film was measured in a similar manner as described above, and the measured value was taken as the surface electric resistance after a high-temperature and high-humidity test.

<Total Light Transmittance>

First, the total light transmittance of the glass substrate with conductive film was measured using a photometer "Haze Meter NDH2000" manufactured by NIPPON DENSHOKU INDUSTRIES Co., LTD. The numerical values indicate values of the coating film alone.

<Pencil Hardness>

The pencil hardness of the conductive film was measured using a surface property testing machine "HEIDON-14DR" manufactured by SHINTO Scientific Co., Ltd.

<Glass Cutting Property>

The glass with conductive film was cut using a simple scriber "Linear Cutter LC200AHH" and a scribe wheel "APIO φ3 mm TYPEA" manufactured by MITSUBOSHI DIAMOND INDUSTRIAL CO., LTD., and the glass cutting property was evaluated.

The conditions in cutting were set as follows: a load of 10 N, a cutting depth of 0.15 μm, and a scribe length of 100 mm. Cutting was repeated 100 times under the conditions. Thereafter, the states of wheel-adhered materials and cut plane were visually examined. The evaluation criteria were defined as follows.

Evaluation Criteria on Glass Cutting Property

○: no adhered materials and favorable cut plane, Δ: a little adhered materials and slightly chipped cut plane, x: adhered materials and chipped cut plane <Warpage>

A conductive film was fabricated in a similar manner as in the fabrication of a conductive film described above except that a non-alkali glass substrate having a thickness of 0.1 mm was used, and the warped state of the conductive film was examined.

○: no lifting of glass edge, Δ: slight lifting, x: remarkable lifting

TABLE 4

| Category | Properties and evaluation items | Example 1 | Example 2 | Example 3 | Example 4 |
|---|---|---|---|---|---|
| Conductive film | Filler content (wt %) | 75.2 | 76.2 | 40.7 | 72.4 |
| | Binder content (wt %) | 24.8 | 23.8 | 59.3 | 27.6 |
| | Film thickness (nm) | 45 | 72 | 119 | 270 |
| | Warpage | ○ | ○ | ○ | ○ |
| | Surface electric resistance (Ω/□) | 2.5E9 | 7.1E8 | 4.3E9 | 8.0E7 |
| | Same as above (after high-temperature and high-humidity test) | 1.1E9 | 5.5E8 | 1.8E9 | 5.6E7 |
| | Total light transmittance (%) | 99.5 | 99.2 | 99.4 | 98.5 |
| | Pencil hardness | 5H | 6H | 7H | 7H |
| | Glass cutting property | ○ | ○ | ○ | ○ |

TABLE 5

| Category | Properties and evaluation items | Comparative Example 1 | Comparative Example 2 | Comparative Example 3 |
|---|---|---|---|---|
| Conductive film | Filler content (wt %) | 75.5 | 75.2 | 58.1 |
| | Binder content (wt %) | 24.5 | 24.8 | 41.9 |
| | Film thickness (nm) | 47 | 45 | 280 |
| | Warpage | ○ | Δ | x |
| | Surface electric resistance (Ω/□) | 2.5E11 | 2.1E9 | 5.4E8 |
| | Same as above (after high-temperature and high-humidity test) | 4.2E9 | 9.8E8 | 3.9E10 |
| | Total light transmittance (%) | 94.2 | 98.7 | 95.8 |
| | Pencil hardness | 2H | 5H | 4H |
| | Glass cutting property | Δ | Δ | x |

<Fabrication of In-Cell Touch Panel>

A liquid crystal display device having a configuration illustrated in FIG. 1 was fabricated, which had 4 inches of screen size and 0.3 mm of the total thickness of the liquid crystal display device.

The conductive film was formed by applying the above-described coating liquid on the upper surface of a touch panel substrate using a spray coater under the similar conditions as described above, and then drying the coating liquid in a dryer at 120° C. for 1 hour. Next, an earth wire was attached to the end of this conductive film with a silver paste ("DOTITE D-362" manufactured by FUJIKURA KASEI CO., LTD.), and then a polarizing plate was attached onto the conductive film. Moreover, a pixel electrode and a common electrode were provided, and a polarizing plate was attached on the backlight side of the lower glass substrate.

Next, the touch sensitivity and electrostatic discharge (ESD) property of the respective liquid crystal display devices were examined as follows.

<Touch Sensitivity>

The liquid crystal display device was touched with a finger, and the touch sensitivity was examined. The result was evaluated as follows:

○: a case in which the liquid crystal display device responded to the finger touch, x: a case in which the liquid crystal display device did not respond to the finger touch.

In addition, after the glass substrate with conductive film was held in an environment having a temperature of 65° C. and a relative humidity of 90% for 500 hours, the touch sensitivity of the conductive film was measured in a similar manner as described above, and the measured result was taken as the touch sensitivity after a high-temperature and high-humidity test.

<ESD Shielding Property>

After confirming that the liquid crystal display device was in black display in a non-energized state by irradiating light from the lower glass substrate side using a backlight, static electricity was applied to the upper glass substrate at a voltage of ±12 kV using an electrostatic applicator. Thereafter, the earth wire of the conductive film was grounded, and the display in the non-energized state was visually examined. The result was evaluated as follows:

○: a case in which the liquid crystal display device maintained black display, x: a case in which white floating due to light leakage was confirmed.

In addition, after the glass substrate with conductive film was held in an environment having a temperature of 65° C. and a relative humidity of 90% for 500 hours, the ESD property of the conductive film was measured in a similar manner as described above, and the measured result was taken as the ESD property after a high-temperature and high-humidity test.

The results were shown in Tables 6 and 7.

TABLE 6

| Category | Evaluation items | Example 1 | Example 2 | Example 3 | Example 4 |
|---|---|---|---|---|---|
| Touch panel | Touch sensitivity | ○ | ○ | ○ | ○ |
| | Same as above (after high-temperature and high-humidity test) | ○ | ○ | ○ | ○ |
| | ESD shielding property | ○ | ○ | ○ | ○ |
| | Same as above (after high-temperature and high-humidity test) | ○ | ○ | ○ | ○ |

TABLE 7

| Category | Evaluation items | Comparative Example 1 | Comparative Example 2 | Comparative Example 3 |
|---|---|---|---|---|
| Touch panel | Touch sensitivity | x | ○ | — |
| | Same as above (after high-temperature and high-humidity test) | ○ | Δ | — |
| | ESD shielding property | x | ○ | — |
| | Same as above (after high-temperature and high-humidity test) | x | Δ | — |

From the results in Tables 4 and 6, the conductive film fabricated using the coating liquid of the present invention can provide a conductive film which has high ESD function, does not decrease the touch sensitivity, and has excellent light transmittance and hardness. Furthermore, it can be seen that various properties are maintained even after a high-temperature and high-humidity test.

On the other hand, from the results in Tables 5 and 7, it can be seen that the conductive film of Comparative Example 1 fabricated using a coating liquid which does not contain chain-like ATO particles has high surface electric resistance, low transmittance and low pencil hardness. In other words, it is clear that the touch sensitivity and the ESD property are inferior in a case in which the conductive film is incorporated in a liquid crystal display device.

In addition, in the conductive film of Comparative Example 2 fabricated using a coating liquid containing an alkoxysilane having a weight average molecular weight of less than 1,000 as a binder, warpage occurs owing to the heat treatment in the coating film fabricating process. This is because the curing shrinkage phenomenon of the coating film due to the dehydration condensation reaction easily occurs in a case in which the molecular weight of alkoxysilane is low. Furthermore, it can be seen that when heating is proceeded in a high-temperature and high-humidity test, unreacted alkoxysilane reacts, and thus the warpage further occurs and it adversely affects the touch sensitivity and ESD property that were not problematic in the initial stage.

DESCRIPTION OF REFERENCE NUMBERS

1 . . . in-cell touch panel,
2 . . . lower polarizing plate,
3 . . . upper polarizing plate,
4 . . . TFT array substrate,
5' . . . common electrode with touch electrode,
72 . . . liquid crystal layer,
8 . . . color filter substrate,
9 . . . conductive film.

What is claimed is:

1. A coating composition comprising chain-like conductive inorganic particles, a binder, a high-boiling solvent, and a low-boiling solvent, wherein a content of the chain-like conductive inorganic particles is 30-90% by mass based on a total amount of the chain-like conductive inorganic particles and the binder, the binder is alkoxysilane oligomer having a weight-average molecular weight of 1,000 to 20,000, and the coating composition is used for forming conductive film on a substrate surface on the opposite side to a liquid crystal layer side of a color filter substrate in a liquid crystal display panel having a TFT array substrate, a touch detection electrode, the liquid crystal layer, and the color filter substrate.

2. The coating composition according to claim 1, wherein the liquid crystal display panel is an in-cell touch panel.

3. The coating composition according to claim 1, wherein the substrate on which a conductive film is formed has a thickness of 500 μm or less.

4. The coating composition according to claim 1, wherein the substrate on which a conductive film is formed is a stacked body having a TFT array substrate in a lowermost layer and a color filter substrate in an uppermost layer.

5. The coating composition according to claim 1, wherein the coating composition contains solid content composed of the chain-like conductive inorganic particles and the binder in an amount of 0.1% to 20.0% by mass and has a viscosity of 0.5 to 100 mPa·s.

6. The coating composition according to claim 1, wherein the chain-like conductive inorganic particles are formed by linking 2 to 50 of primary particles having a particle diameter of 2 to 30 nm to each other.

7. The coating composition according to claim 1, wherein the chain-like conductive inorganic particles include at least one kind of particles selected from the group consisting of antimony-containing tin oxide particles, tin-containing indium oxide particles and phosphorus-containing tin oxide particles.

8. A conductive film formed, using the coating composition according to claim 1, on a substrate surface on the opposite side to a liquid crystal layer side of a color filter substrate in a liquid crystal display panel having a TFT array substrate, a touch detection electrode, the liquid crystal layer and the color filter substrate.

9. The conductive film according to claim 8, wherein the conductive film has a thickness of 10 to 300 nm.

10. The conductive film according to claim 8, wherein the conductive film has a surface electric resistance of $1.0 \times 10^7$ to $1.0 \times 10^{10}$ Ω/square.

11. The conductive film according to claim 8, wherein the conductive film has a pencil hardness of 3H to 9H.

12. A liquid crystal display panel comprising a TFT array substrate, a touch detection electrode, a liquid crystal layer, a color filter substrate and the conductive film according to claim 8.

* * * * *